United States Patent
Liu

(10) Patent No.: US 6,307,503 B1
(45) Date of Patent: Oct. 23, 2001

(54) METHOD AND SYSTEM OF DETERMINING USER TERMINAL POSITION USING A MEASURED SIGNAL PROPAGATION DELAY AND DOPPLER SHIFT OF A COMMUNICATIONS LINK

(75) Inventor: Xiangdong Liu, Germantown, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/212,528

(22) Filed: Dec. 16, 1998

Related U.S. Application Data

(60) Provisional application No. 60/084,634, filed on May 7, 1998.

(51) Int. Cl.[7] .................................................. H04B 7/185
(52) U.S. Cl. ............................... 342/357.05; 342/357.01; 342/357.04
(58) Field of Search ....................... 342/357.01, 357.04, 342/357.05; 455/12.1; 701/207

(56) References Cited

U.S. PATENT DOCUMENTS

| | | | |
|---|---|---|---|
| 5,148,179 | 9/1992 | Allison | 342/357 |
| 5,572,427 | 11/1996 | Link et al. | 364/443 |
| 5,589,834 | 12/1996 | Weinberg | 342/354 |
| 5,666,647 | 9/1997 | Maine | 455/12.1 |
| 6,128,468 | * 10/2000 | Wyrwas | 455/12.1 |
| 6,157,621 | * 12/2000 | Brown et al. | 370/310 |

* cited by examiner

*Primary Examiner*—Dao Phan
(74) *Attorney, Agent, or Firm*—John T. Whelan; Michael W. Sales

(57) ABSTRACT

A system (20) and method (40) for determining a user terminal (23) location on the surface of the earth relies on the signal propagation delay and Doppler shift of radio frequency (RF) transmissions between the user terminal (UT) (23) and a satellite (22). An iterative procedure is employed to improve the accuracy of the location determination. Within the procedure, the position of the UT is estimated based on the propagation delay, Doppler shift, and a spherical approximation of the earth's shape. The radius of the earth at the estimated UT position is adjusted using a predetermined model of the earth's shape, such as an ellipsoid approximation. The adjusted radius value is then used to re-estimate the UT location using the spherical approximation. The iterative procedure continues until the estimated UT location converges to a predetermined accuracy. The position of the user terminal location can be determined based on a earth-central angle $\alpha$ and an azimuth angle $\beta$, which can be directly derived from the signal propagation delay and Doppler shift, respectively, using a set of closed-form equations.

15 Claims, 3 Drawing Sheets

METHOD AND SYSTEM OF DETERMINING USER TERMINAL POSITION USING A MEASURED SIGNAL PROPAGATION DELAY AND DOPPLER SHIFT OF A COMMUNICATIONS LINK

RELATED APPLICATIONS

This application is based on and claims benefit from provisional application entitled "Efficient Method to Determine the Position of a User Terminal Using Measured Delay and Doppler of the Communications Link" which was filed on May 7, 1998, and respectively accorded Ser. No. 60/084,634.

TECHNICAL FIELD OF THE INVENTION

The present invention relates generally to position determination, and in particular, to a method and system of determining the location of a user terminal on the surface of the earth using signal propagation delay and Doppler shift derived from a communications link between the user terminal and a mobile radio frequency (RF) source, such as a satellite.

BACKGROUND OF THE INVENTION

In mobile communications systems, user terminal (UT) position determination based on signal propagation delay and Doppler shift is known. Typically, the propagation delay and Doppler shift are derived from a radio-frequency (RF) carrier transmitted between the UT and a moving transceiver, for example, a transceiver included on a moving airplane or satellite. The Doppler shift is a well known physical phenomenon and represents the observed change in frequency of the propagated RF wave that occurs due to the relative motion between the UT and the transceiver. The measured signal propagation delay is the amount of time required for an electromagnetic signal to travel between the UT and the moving transceiver. From this delay, it is easy to calculate the distance separating the UT and transceiver by multiplying the delay by the speed at which the electromagnetic signal travels, which is generally at or near the speed of light.

One approach to determining UT position is to represent the signal propagation delay and Doppler shift as a system of equations that are functions of the UT position. For example, the propagation delay can be a function f of the UT position, while the Doppler shift can be a function g of the same.

propagation delay=$f$ (UT position)

Doppler shift=$g$ (UT position)

To determine the UT location using this approach, the system of equations is solved for the UT position. This is usually an iterative procedure, such as the Newton-Raphson Method, that numerically searches for an approximation of the UT position. Such an approach is computationally intensive, requiring substantial computer resources, such as processor bandwidth, memory, and the like. Consequently, this approach is impracticable in systems where computational resources and response times are limited, such as mobile communication systems. For instance, in satellite mobile communication systems, it may be necessary to perform 100–200 UT position determinations per second during peak usage. Another drawback to this approach is that its search uses two pieces of information, namely, the delay and Doppler, which yields two possible UT positions, and thus two possible solutions to the system of equations. Such situations are generally fatal to numerical search techniques, as they often cannot converge or converge to the wrong solution.

Another conventional approach to determining the UT position is to rely on the Global Position System (GPS). However, GPS receivers are expensive. Requiring each UT in a communication system to include a GPS receiver would dramatically increase costs. In addition, on cold-start power up, it often takes a GPS receiver several minutes to acquire its position. This lengthy acquisition time is impracticable in many applications. Moreover, in such a system, each UT position determination may need to be performed at the beginning of a phone call without noticeable delay to the user.

SUMMARY OF THE INVENTION

It is an advantage of the present invention to provide a novel method and system for determining UT position as a function of measured signal delay and Doppler shift. The method and system disclosed herein is significantly faster and less expensive, i.e., requires less computer resources, than conventional positioning techniques, such as GPS.

According to one embodiment of the invention, a system for determining the location of the UT on the surface of the earth includes a receiver and a processor. A ground station tracks an orbiting satellite, providing satellite position and velocity information to the processor. The receiver can measure a signal propagation delay and Doppler shift of an electromagnetic signal transmitted between the UT and the satellite.

The propagation delay and Doppler shift are provided to the processor along with the satellite velocity and position. The processor then determines the location of the UT by iteratively applying both a spherical and a refined approximation of the earth's shape. Initially, the UT's position is estimated using a spherical approximation of the earth. A set of closed-formed equations can be evaluated directly to yield this estimation. Next, the earth's radius at the estimated location is adjusted according to the refined model of the earth, such as the WGS-84 ellipsoid model of the earth. The UT location is then re-estimated using the spherical approximation and updated radius. The approximations are repeated until the estimated UT location converges to a predetermined level of accuracy. Using this approach, convergence to a position solution is assured.

It will be understood that both the foregoing general description and the following detailed description are exemplary and intended to provide further explanation of the invention as claimed. The accompanying drawings provide an understanding of the invention as described in the embodiments to illustrate the invention and serve to explain the principles of the invention.

DETAILED DESCRIPTION OF THE PREFERRED EMBODIMENT

Figure 1:
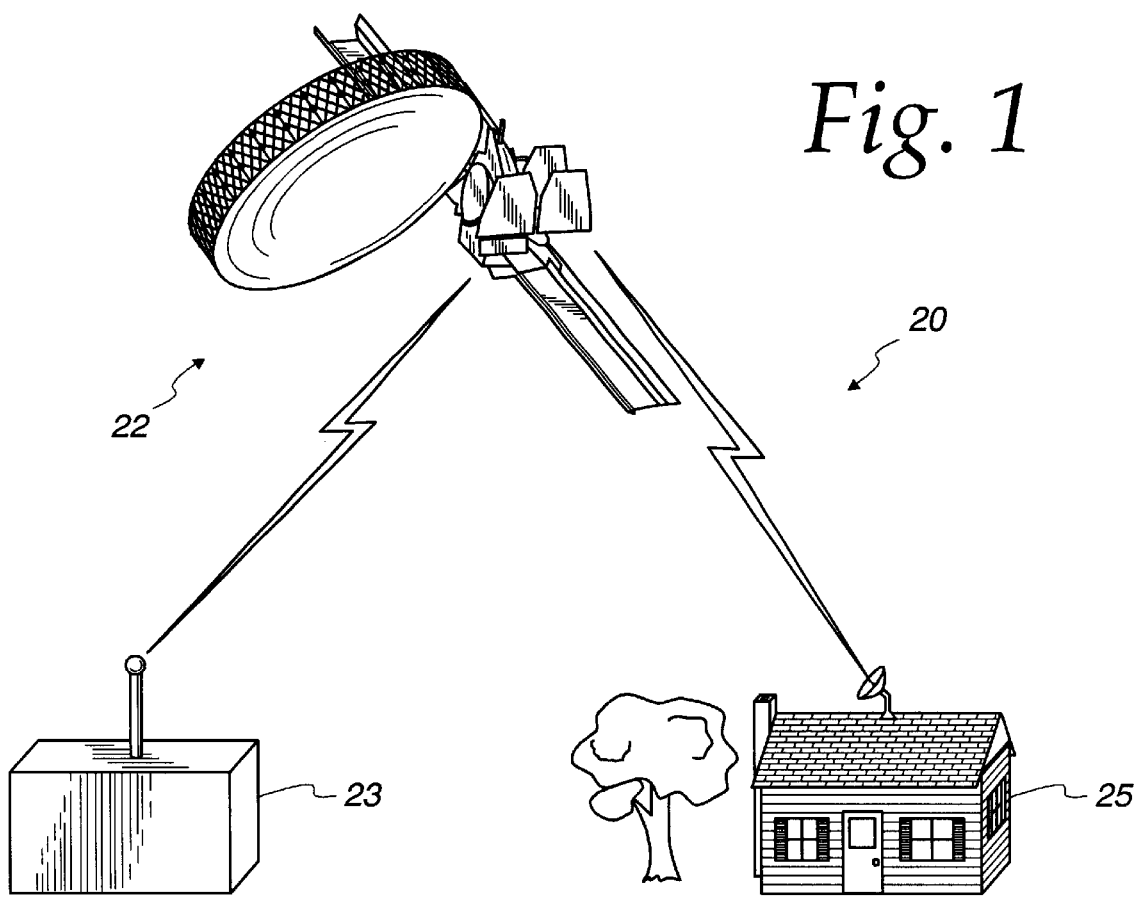
FIG. 1 is a diagram of a mobile communications system in accordance with an embodiment of the present invention.

Turning now to the drawings, and in particular to FIG. 1, a satellite communications system 20 in accordance with one embodiment of the invention is illustrated. The system 20 includes a satellite 22, a terrestrial-based user terminal (UT) 23, and a ground station 25. The UT 23 and ground station 25 are in radio frequency (RF) communication with the satellite 22. The ground station 25 and UT 23 can communicate with one another via the RF communication link with the satellite 22.

The UT 23 can be a mobile handset or any other device suitable for satellite communications. The satellite 22 can be a communications satellite having a phased array antenna (not shown) capable of emitting a plurality of spot beams onto the surface of the earth. The ground station 25 can include a subsystem for tracking the satellite's position and velocity relative to a predetermined coordinate system, such as the earth-centered, earth-fixed (ECEF) coordinate system.

The satellite tracking can be accomplished using conventional techniques; and satellite position and velocity can be obtained via real-time tracking or predicted periodical tracked data. Well-established techniques of astro-dynamics are used to obtain data on the position and velocity of the satellite.

Figure 2:
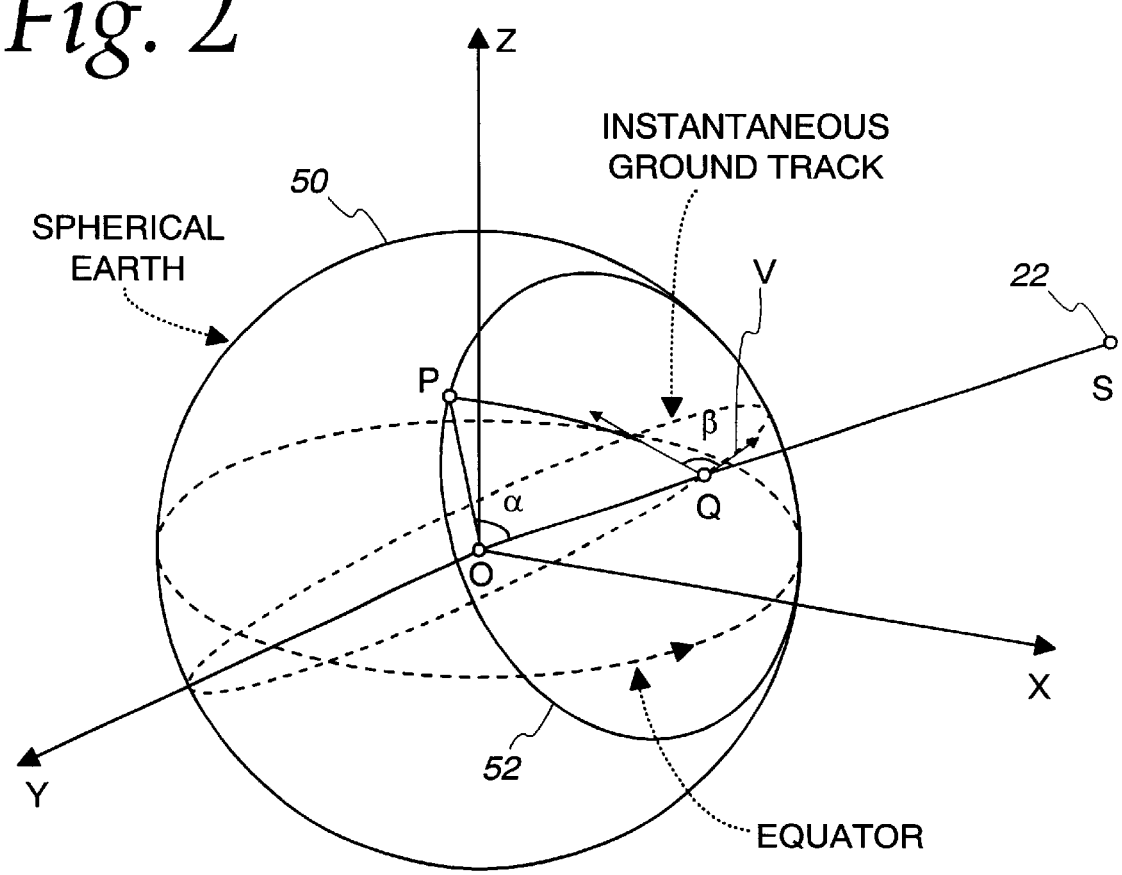
FIG. 2 is a perspective view of a satellite orbiting the earth and a UT located on the surface of the earth.

The UT position determination method and system utilize three pieces of information. The signal propagation delay and Doppler shift of the communication link between the UT 23 and the satellite 22 represent two of these pieces. As depicted in FIG. 2, the measured propagation delay limits a possible UT position to an approximate circle 52 centered at a subsatellite point Q. The Doppler shift further specifies two possible points on the circle 52 at which the UT 23 may be located. A third piece of information, such as the identity of the spot beam that serves the area in which the UT 23 is located, can be used to resolve at which of the two possible UT positions the UT is located.

Figure 3:
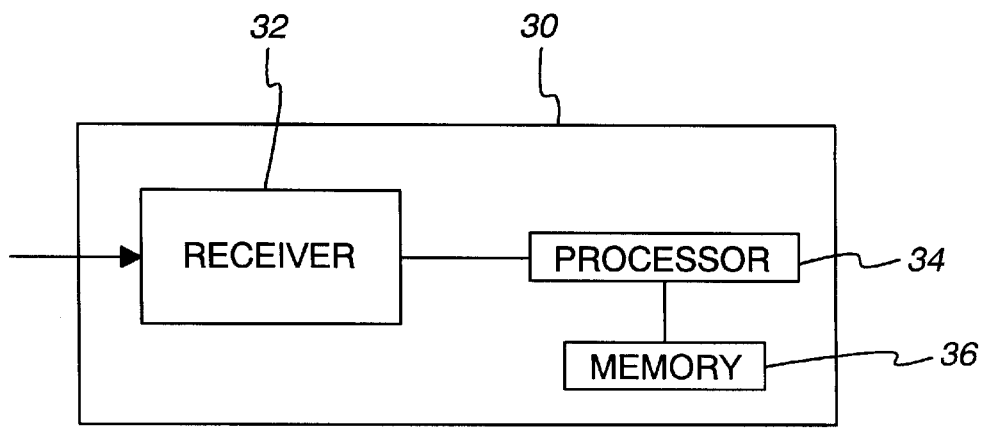
FIG. 3 is a block diagram of a position determination unit (PDU) included in the communications system of FIG. 1.

Referring now to FIG. 3, there is shown a position determination unit (PDU) 30 that includes a receiver 32, a processor 34 and a computer memory 36. The PDU 30 can be included in the ground station 25. However, the PDU 30 can alternately be included in either the user terminal 23, the satellite 22, or in any other device in communication with the UT 23 or satellite 22.

The receiver 32 includes circuitry for converting RF signals received from the RF communication link into digital data suitable for use by the processor 34. The receiver 32 can be a conventional quadrature phase shift keying (QPSK) MODEM for satellite communications. The receiver 32 can also provide digitized representations of system information, such as the satellite position and velocity, to the processor 34. In addition, the receiver 32 is capable of determining a signal propagation delay and a Doppler shift of RF signals transmitted between the UT 23 and the satellite 22. Techniques for measuring propagation delay and Doppler shift of an RF signal are well known.

The position determination technique disclosed herein does not depend on how the path propagation delay and Doppler shift are obtained. Accordingly, these values can be measured from a carrier signal included in RF bursts transmitted between the UT 23 and ground station 25. For instance, when the UT 23 establishes radio communication with the ground station 25 via the satellite 22, it first sends a random access channel (RACH) burst. In response to the RACH burst, the ground station 25 transmits an access grant channel (AGCH) burst. After receiving the AGCH burst, the UT 23 transmits a number of dedicated control channel (DCCH) bursts. The receiver 32 can measure the propagation delay and the Doppler shift of the communications link from the RACH burst as well as the subsequent DCCH bursts from the UT 23. The ground station 25 can also keep track of the satellite position and velocity, as well as the identity of the spot beam that serves the UT 23. From this information, the processor 34 determines the UT position.

The processor 34 can be any electronic device capable of performing computations using the data provided by the receiver 32. The processor 34 can include a general purpose computer, a microprocessor, a digital signal processor (DSP), or an application specific integrated circuit (ASIC) designed to perform position determination as disclosed herein.

The memory 36 is computer-readable media that can store a set of executable instructions for directing the processor 34 to determine the position of the UT 23. The algorithm embodied by these instructions is depicted by the flowchart in FIG. 4.

Figure 4:
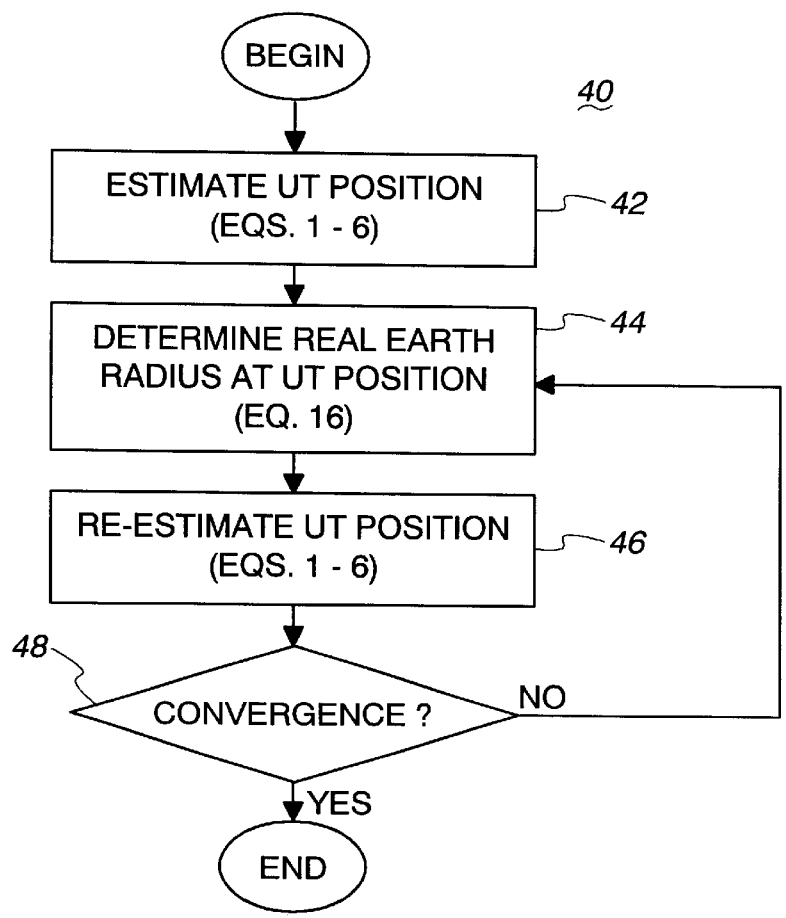
FIG. 4 is a flowchart diagram illustrating a method of determining the user terminal location in accordance with an embodiment of the present invention.

The system operates in accordance with a method 40 for determining the location of the UT 23, as set forth in FIG. 4. The processor 36 operates in accordance with the method 40 to determine the UT position on the surface of the earth using measured signal propagation delay and Doppler shift of the communication link between the UT 23 and satellite 22. The method embodies at least two novel features: (1) locating the UT using a spherical approximation of the earth by evaluating a sequence of closed-form equations, and (2) adjusting the radius of the earth at the UT position using a refined approximation of the earth's shape, such as an ellipsoid approximation or the like.

For the first feature, the UT position is represented by two angles $\alpha$ and $\beta$, where $\alpha$ is the earth central angle subtending the UT and the subsatellite point and $\beta$ is the azimuth angle between a vector V defining the satellite motion direction and the UT position P, measured at the subsatellite point. FIG. 2 illustrates $\alpha$, $\beta$, the UT position P, and subsatellite point Q.

Using $\alpha$ and $\beta$ to indicate the UT position, the following relationship holds:

$\alpha = F$ (delay)

$\beta = G$ ($\alpha$, Doppler)

where F and G are inverse trigonometric functions. The position of the UT 23 can be calculated by first evaluating F and G in sequence to yield $\alpha$ and $\beta$.

With respect to the second feature, the angles $\alpha$ and $\beta$ can be converted to a convenient format, such as a longitude and latitude or ECEF coordinate systems, so that the appropriate refined model can be applied. The refined model provides a more accurate representation of the earth's radius, and thus a more accurately estimated UT position.

Figure 5:
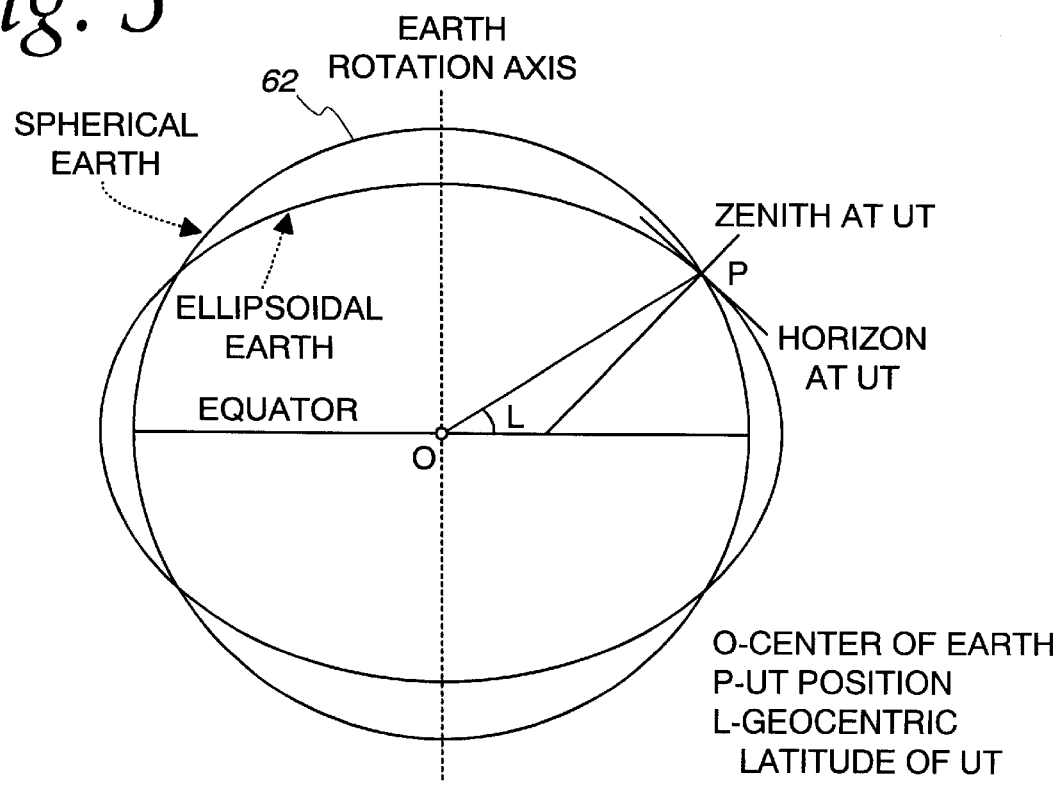
FIG. 5 is a cross-sectional view illustrating an ellipsoid earth super-imposed on a spherical earth.

The method 40 starts by estimating the position of the UT on an imaginary, spherical earth that has a reasonable radius. The reasonable radius can be the earth's radius at the subsatellite point, as determined using the WGS-84 ellipsoid approximation (Eq. 16) of the earth's shape. From the estimated UT position, the adjusted local radius of the earth is determined using the refined model. A new estimation of the UT position on the spherical earth is made using the adjusted radius. These steps repeat-until the estimated UT position converges. The position converges because, if the adjusted radius is used, the position of the UT on the spherical earth is the same as on the elliptical earth. This is depicted in FIG. 5, which shows a cross-sectional view of the ellipsoid earth 60 super-imposed imposed on a spherical approximation of the earth 62.

Turning now to the flowchart of FIG. 4, in step 42, the UT position is first estimated using a spherical approximation of the earth's shape. With the spherical approximation, the UT position is represented by the two angles α and β, as shown in FIG. 2. In step 42, α and β are determined using Eqs. 1–6. The angle α can be calculated from Eq. 1 immediately, which is equivalent to function F described above.

$$\alpha = \arccos \frac{R^2 + r^2 - (CT_d)^2}{2Rr} \quad (1)$$

Where $T_d$ is the measured signal propagation delay, R is earth radius, r is the satellite radius (distance between earth center and satellite), and C is the speed of light.

Equation 1 is derived by applying the law of cosines to determine the distance between UT position P and the satellite position S (FIG. 2), as a function of α. This yields an equation for the distance (not shown) between the UT and satellite. Dividing both sides of this equation by the speed of light yields an equation for $T_d$. In turn, solving this delay equation for α results in Eq. 1. β can be calculated from Eq. 2.

$$F_d = A \cos(\beta - B) + C \quad (2)$$

$F_d$ represents the measured Doppler Shift, while A, B, and C are constants in β and are dependent upon α, R, earth rotation rate, and satellite position and velocity. The values of A, B and C need to be determined first, before β can be determined. This can be accomplished by solving Eq. 2 for A, B, and C at three different coordinate points (α, β), where the Doppler shift can be predetermined. With a fixed arbitrary value of α, β=0, β=π, and β=π/2 correspond to the three points on earth. At each of these points, the Doppler value can be determined based on the satellite velocity and RF carrier frequency. Both of these values are known by the tracking station.

It can be mathematically and empirically verified that the measured Doppler shift behaves as a sinusoidal function of β on a circle on the surface of the earth centered at the subsatellite point for a given value of α. Thus, by determining values for A, B and C, the Doppler shift $F_d$ is accurately represented by Eq. 2.

Let $F_0$, $F_1$, and $F_2$ be the respective Doppler values at each of the three points. The constants A, B, and C are then given by:

$$C = (F_0 + F_1)/2 \quad (3)$$

$$A = \sqrt{(F_0 - C)^2 + (F_2 - C)^2} \quad (4)$$

$$B = \frac{\pi}{2} - \arccos \frac{F_2 - C}{A} \quad (5)$$

Rearranging Eq. 2, β can then be calculated as:

$$\beta = \pm \arccos \frac{F_d - C}{A} + B \quad (6)$$

Equation 6 is equivalent to the function G described above.

For a single Doppler shift value $F_d$, Eq. 6 yields two possible values of β. The ambiguity of which value of β actually represents the UT position can be resolved by identifying the spot beam serving the UT. This can be accomplished using a pilot signal, which is included in each spot beam transmission, typically in the broadcast control channel (BCCH). Each pilot signal includes a carrier having a unique frequency, permitting it to be identified from among other pilot signals. Since the pilot signal frequency is Doppler shifted, a predetermined window of frequencies corresponds to each spot beam. The frequency windows do not overlap. Therefore, the UT can determine the frequency window in which the strongest pilot signal appears to identify the corresponding spot beam. The UT determines its spot beam by selecting the pilot signal having the greatest strength. Equation 6 corresponds to function G discussed earlier. The ground station 25 can identify the serving spot beam from the carrier frequency being used by the UT 23.

According to an exemplary embodiment of the invention, in step 44, the radius of the earth at the UT position is adjusted according to a refined model of the earth's shape, such as the ellipsoid model. Using the ellipsoid model, for example, the UT position given by (α, β) is translated to the ECEF coordinate system. The translation permits determination of the local radius of the earth's shape to be a function of the UT's latitude. The latitude of the UT position can be easily derived from its location in the ECEF coordinate system.

The UT position in α and β can be translated to an ECEF coordinate system using the following transformations, given by Eq. 15. The variables used in Eqs. 7–15 are defined as follows:

S=Satellite position in ECEF
S'=Satellite velocity in ECEF
Ls=The latitude of the satellite
Is=The longitude of the satellite
P=UT position in ECEF
R=The radius of the Earth
Q'=Direction of satellite velocity component tangent to subsatellite point To calculate the ECEF coordinates of the UT, the subsatellite point is rotated such that it is on the x-axis. To accomplish this, the subsatellite point is rotated first by the satellite latitude and then by its longitude. The UT position in the ECEF corresponding to the rotated subsatellite point is then calculated. The subsatellite point is then rotated back to its true position, and the actual UT position in the ECEF is then calculated. The following mathematical equations describe the transformations necessary to carry out the above rotations.

Since the angled β has reference to the satellite inertial motion direction V, it is necessary to know the direction that β=0 corresponds to when the subsatellite point is on the x-axis, as described above. Accordingly, the angle $\beta_0$ represents that direction when the subsatellite point is on the x-axis, where $\beta_0$ is the angle between the component of the satellite inertial motion tangent to the subsatellite point and the X-Y plane. The value of $\beta_0$ is obtained by rotating the component of the satellite inertial velocity tangent to the subsatellite point in reverse order as we do the UT position, that is, backward by longitude, the longitude of the satellite and then backward by the satellite latitude.

The satellite velocity component Q' is given by the cross-product of S' and S:

$$Q' = S \times S' \times S \qquad (7)$$

The latitude and longitude of the satellite can be calculated using Eqs. 8–11.

$$\sin(Ls) = \frac{z_s}{\sqrt{x_s^2 + y_s^2 + z_s^2}} \qquad (8)$$

$$\cos(Ls) = \frac{\sqrt{x_s^2 + y_s^2}}{\sqrt{x_s^2 + y_s^2 + z_s^2}} \qquad (9)$$

$$\sin(ls) = \frac{y_s}{\sqrt{x_s^2 + y_s^2}} \qquad (10)$$

$$\cos(ls) = \frac{x_s}{\sqrt{x_s^2 + y_s^2}} \qquad (11)$$

To yield the angle $\beta_0$, Eq. 12 is used to rotate the satellite velocity component Q' around the y-axis, by the latitude Ls, and then around the z-axis by the longitude ls. The coordinates of the vector $P_{ref}$ are then used to calculate $\cos \beta_0$ and $\sin \beta_0$ in Eqs. 13–14.

$$P_{ref} = \begin{bmatrix} \cos(Ls) & 0 & \sin(Ls) \\ 0 & 1 & 0 \\ -\sin(Ls) & 0 & \cos(Ls) \end{bmatrix} \begin{bmatrix} \cos(ls) & \sin(ls) & 0 \\ -\sin(ls) & \cos(ls) & 0 \\ 0 & 0 & 1 \end{bmatrix} Q' \qquad (12)$$

$$\cos\beta_0 = \frac{y_{Pref}}{\sqrt{y_{Pref}^2 + Z_{Pref}^2}} \qquad (13)$$

$$\sin\beta_0 = \frac{Z_{Pref}}{\sqrt{y_{Pref}^2 + Z_{Pref}^2}} \qquad (14)$$

Equation 15 yields the coordinates (x, y, z) of the UT position P in ECEF.

$$P = \begin{bmatrix} \cos(ls) & -\sin(ls) & 0 \\ \sin(ls) & \cos(ls) & 0 \\ 0 & 0 & 1 \end{bmatrix} \begin{bmatrix} \cos(Ls) & 0 & -\sin(Ls) \\ 0 & 1 & 0 \\ \sin(Ls) & 0 & \cos(Ls) \end{bmatrix}$$
$$\begin{bmatrix} 1 & 0 & 0 \\ 0 & \cos(\beta_0) & -\sin(\beta_0) \\ 0 & \sin(\beta_0) & \cos(\beta_0) \end{bmatrix} \begin{bmatrix} \cos\alpha \\ \sin\alpha\cos\beta \\ \sin\alpha\sin\beta \end{bmatrix} R \qquad (15)$$

In Eq. 15, reading from left to right, the first matrix represents a standard rotation about the z-axis by angle ls; the second matrix represents a standard rotation about the y-axis by Ls; and the third matrix represents a standard rotation about the x-axis by $\beta_0$. The final, single-column matrix represents a scaling vector. R represents the radius of the earth.

Using the coordinates given by Eq. 15, the UT's latitude can be determined using Eq. 7 or Eq. 8 by substituting the UT coordinates for the satellite coordinates. The UT's latitude can be applied to a conventional equation used to approximate the earth's ellipsoid shape. The WGS-84 (World Geodetic System-84), which is also used in the global positioning system (GPS), specifies the earth's radius at a point with geocentric latitude L as:

$$R(L) = R_e \sqrt{1 - e_1^2 \sin^2(L)} \qquad (16)$$

where $R_e$ is earth equatorial radius, $R_e$=6378.137 Km, and $e_1^2$ is the first eccentricity of earth ($\approx$6.69438$\times$10$^{-3}$), and R(L) is the earth's radius at latitude L. The geocentric latitude L of the UT is shown in FIG. 5. Equation 16 represents the first term in a series expansion approximating the earth's ellipsoid shape. The earth is actually an oblate spheroid or ellipsoid, i.e., it is nearly circular in any cross-section that is parallel to the equator, but is close to an ellipse in a cross-section that is perpendicular to the equator.

Using the adjusted radius, the UT position is re-estimated using the spherical approximation (step 46). The re-estimation is accomplished by substituting the updated value of the earth's radius in Eq. 1, and then determining updated values of $\alpha$, $\beta$ using Eqs. 1–6.

Next, a check is made in step 48 to determine whether the updated UT position determined in step 46 has converged to the prior estimate of the UT position. If the difference between two successive estimations is below a predetermined threshold, the position determination is considered to have converged and the procedure terminates. However, if the threshold is exceeded the procedure returns to step 44, where the earth's radius is again adjusted using the refined approximation of the earth's shape. Steps 44–48 repeat-until convergence is achieved.

Alternatively, steps 44 and 46 can be repeated a predetermined number of times, without comparing successive estimations, to determine whether convergence has occurred.

The method 40 can be implemented in software using a repeat-until loop structure. The repeat-until loop can take the following form:

L=Initial estimate of UT latitude (Eqs. 1–15)
REPEAT
R(L)=local radius of ellipsoid earth at latitude L (Eq. 16)
P ($\alpha$,$\beta$)=POS_Det(delay, Doppler, satellite position and velocity, R(L)) (Eq. 1–6)
L=latitude at P ($\alpha$, $\beta$) (Eqs. 7–15)
UNTIL (P converges).

In the above loop, P in each iteration is an approximation of the UT position. Even though the loop is expressed in a repeat-until structure, two iterations can be used to attain a level of accuracy that is acceptable in many mobile communications systems. Therefore, the loop can be made deterministic by using a "For K=1 To 2 Step 1" loop instead of a repeat-until loop structure.

It should be appreciated that a wide range of changes and modifications may be made to the embodiments of the invention as described herein. Thus, it is intended that the foregoing detailed description be regarded as illustrative rather than limiting and that the following claims, including all equivalents, are intended to define the scope of the invention.

What is claimed is:

1. A method of determining a user terminal location on the surface of the earth by referencing a satellite rotating the earth, comprising:

estimating the user terminal location using a spherical approximation of the shape of the earth; and adjusting the estimated user terminal location using a refined approximation of the shape of the earth.

2. The method of claim 1, further comprising:
measuring a signal propagation delay and a Doppler shift of a carrier signal.

3. The method of claim 2, further comprising:
determining the signal propagation delay and the Doppler shift based on a random access channel (RACH) burst from the user terminal.

4. The method of claim 2, further comprising:
determining the user terminal location based on the signal propagation delay and the Doppler shift.

5. The method of claim 1, further comprising:
resolving ambiguity of the user terminal location.

6. The method of claim 5, further comprising:
resolving the ambiguity of the user terminal location based on a spot beam pilot signal emitted by the satellite.

7. The method of claim 1, further comprising:
converting the user terminal location to an earth-centered earth-fixed (ECEF) coordinate system.

8. The method of claim 1, further comprising:
tracking the position of the at least one satellite.

9. A system for determining a location of a user terminal on the surface of the earth, comprising:
a ground station for tracking a position of a satellite;
a receiver capable of determining a signal propagation delay and a Doppler shift of a radio frequency (RF) signal transmitted between the user terminal and the satellite;
a processor, in communication with the receiver, for determining the location of the user terminal, based on the signal propagation delay, the Doppler shift, and a spherical approximation of the shape of the earth in combination with an ellipsoid approximation of the shape of the earth.

10. The system of claim 9 further comprising:
means for resolving ambiguity of the location of the user terminal.

11. The system of claim 10, further comprising:
means for resolving the ambiguity of the location based on a spot beam pilot signal emitted by the satellite.

12. The system of claim 9, further comprising:
means for converting the location of the user terminal to an earth-centered earth-fixed (ECEF) coordinate system.

13. A computer-readable memory storing a program for directing a computing device to determine a user terminal location on the surface of the earth by estimating the user terminal location based on a signal propagation delay and a Doppler shift derived from a radio frequency (RF) signal transmitted between the user terminal and a satellite, and based on a spherical approximation of the shape of the earth and a predetermined refined approximation of the shape of the earth.

14. A method of determining a user terminal location on the surface of the earth by referencing a satellite rotating the earth, the method comprising the steps of:
measuring a signal propagation delay and a Doppler shift of a carrier signal;
determining an earth central angle $\alpha$ between the user terminal and a sub-satellite point, the earth central angle being a function of the signal propagation delay;
determining an azimuth angle $\beta$ between the user terminal and the direction of motion of the satellite measured at sub-satellite points, the azimuth angle being a function of the Doppler shift;
determining an estimated user terminal location based on the earth central angle, the azimuth angle and a spherical approximation of the shape of the earth; and
adjusting the estimated user terminal location using a refined approximation of the shape of the earth.

15. A system for determining a location of a user terminal on the surface of the earth, the system comprising:
a ground station for tracking a position of a satellite;
a receiver adapted to determine a signal propagation delay and a Doppler shift of a radio frequency (RF) signal transmitted between the user terminal and the satellite;
a processor, in communication with the receiver, for determining the location of the user terminal, based on the signal propagation delay, the Doppler shift, and a spherical approximation of the shape of the earth in combination with an ellipsoid approximation of the shape of the earth;
said processor having means for determining an earth central angle $\alpha$ between the user terminal and a sub-satellite point, the earth central angle being a function of the signal propagation delay;
said processor having means for determining an azimuth angle $\beta$ between the user terminal and the direction of the motion of the satellite, the azimuth angle being a function of the Doppler shift;
said processor having means for determining the user terminal location based on the earth central angle and the azimuth angle.

* * * * *